United States Patent
Bitar et al.

(10) Patent No.: US 7,693,613 B2
(45) Date of Patent: Apr. 6, 2010

(54) CURVILINEAR DISTANCE ESTIMATION METHOD FOR A MOVING VEHICLE WITH LIMITED MANEUVERABILITY

(75) Inventors: Elias Bitar, Toulouse (FR); Nicolas Marty, Castelginest (FR)

(73) Assignee: Thales (FR)

( * ) Notice: Subject to any disclaimer, the term of this patent is extended or adjusted under 35 U.S.C. 154(b) by 361 days.

(21) Appl. No.: 10/591,593

(22) PCT Filed: Feb. 9, 2005

(86) PCT No.: PCT/EP2005/050556

§ 371 (c)(1),
(2), (4) Date: Sep. 5, 2006

(87) PCT Pub. No.: WO2005/095888

PCT Pub. Date: Oct. 13, 2005

(65) Prior Publication Data

US 2007/0187554 A1    Aug. 16, 2007

(30) Foreign Application Priority Data

Mar. 5, 2004   (FR) .................................. 04 02347

(51) Int. Cl.
*G05D 1/00* (2006.01)
*G06F 7/00* (2006.01)
*G06F 17/00* (2006.01)

(52) U.S. Cl. ................ 701/3; 701/4; 701/5; 701/7; 701/8; 701/10; 701/12; 701/300; 701/301; 340/967; 340/968; 340/969; 340/970; 340/974; 340/975; 340/976; 340/977

(58) Field of Classification Search .............. 701/1, 701/3–5, 7–8, 10–12, 300–301; 340/967–970, 340/974–977
See application file for complete search history.

(56) References Cited

U.S. PATENT DOCUMENTS 4,853,700 A * 8/1989 Funatsu et al. ................. 342/30

(Continued)

FOREIGN PATENT DOCUMENTS

FR    2842594    1/2004

(Continued)

OTHER PUBLICATIONS

Borgefors, Gunilla, "Distance Transformation in Digital Images", Computer Vision, Graphics and Image Processing, vol. 34, pp. 344-378, Feb. 1986.

*Primary Examiner*—Jack W. Keith
*Assistant Examiner*—Chuong P Nguyen
(74) *Attorney, Agent, or Firm*—Lowe Hauptman Ham & Berner, LLP

(57) ABSTRACT

In distance maps used in order to facilitate the navigation of craft such as an aircraft, the distances estimated take into account obstacles to be circumvented but not the maneuverability of the craft. The adaptation route required by the craft in order to take the right direction is not taken into account so that certain distance estimates for accessible points located in the neighborhood of the craft are unrealistic. In order to make a distance map more realistic, it is proposed that an obstacle of concave shape associated with the craft be added behind the position of the craft, forcing the estimations of distances to be circumvented an area that is inaccessible to the craft for reasons of maneuverability.

14 Claims, 9 Drawing Sheets

U.S. PATENT DOCUMENTS

| | | | | |
|---|---|---|---|---|
| 4,862,373 | A | * | 8/1989 | Meng .................... 701/209 |
| 5,086,396 | A | * | 2/1992 | Waruszewski, Jr. ......... 701/221 |
| 5,416,713 | A | * | 5/1995 | Kameda et al. ............ 701/301 |
| 5,448,233 | A | * | 9/1995 | Saban et al. ................ 340/963 |
| 5,761,391 | A | * | 6/1998 | Sato et al. .................. 700/255 |
| 5,969,665 | A | * | 10/1999 | Yufa ........................ 342/41 |
| 6,021,374 | A | | 2/2000 | Wood |
| 6,469,664 | B1 | | 10/2002 | Khatwa et al. |
| 7,113,617 | B2 | | 9/2006 | Kimmel et al. |
| 2004/0215372 | A1 | * | 10/2004 | Bateman et al. ............. 701/1 |

FOREIGN PATENT DOCUMENTS

FR            0311320          12/2005

* cited by examiner

CURVILINEAR DISTANCE ESTIMATION METHOD FOR A MOVING VEHICLE WITH LIMITED MANEUVERABILITY

BACKGROUND OF THE INVENTION

1. Field of the invention

The invention relates to terrain navigation and, more particularly, to estimations of curvilinear distance taking into account any potential obstacles to be circumvented.

2. Description of the prior art

The Applicant has already proposed, in a French patent application filed on Sep. 26, 2003, under the number 0311320, a method for estimating the distances, with respect to a reference point, of the points on a map taken from a database of elevation of the terrain. This method implements a distance transform by propagation and takes account of obstacles to be circumvented whose shape may change over time, such as mountains seen by an aircraft having an imposed vertical flight profile with altitude variations which mean that the same ground feature posing a threat at a certain moment no longer poses a threat at another or vice versa. The distance transform by propagation is used to establish a distance map covering a region of a given size where a craft is traveling and having the instantaneous position of the craft as origin of the distance measurements. This distance map, which is not designed to be displayed, is used to trace a geographical map which is displayed and which represents the region of travel segmented into areas shown in false colors which are bounded as a function of the possibility for the craft to get past them and of the time that the latter would take to reach them when they are passable, for example red for impassable obstacles, yellow for far away accessible regions and green for nearby accessible regions.

While the estimations of distance made when the distance map is established take into account the obstacles to be circumvented and the change in the threat that they represent for the craft as a function of the degree of accomplishment of its mission, they do not take into account the maneuverability of the craft so that the distance estimations made lack realism for certain points situated in the near neighborhood of the craft. In fact, especially in the case of an aircraft, the estimations of distance are conducted in the same fashion whether the point considered is located in front of or behind the aircraft, even though the aircraft can reach a point located in front of it without difficulty but must make a complete U-turn in order to reach a point located behind it, the extent of the U-turn depending on its capacity to turn, in the direction in which it steers: with the wind or against the wind, and on the strength of the cross-wind.

SUMMARY OF THE INVENTION

The goal of the present invention is to ensure that the estimations of curvilinear distance, obtained by the method described in the aforementioned French patent application or by another method, are coherent and realistic by prohibiting them from being measured over routes that cannot be reached by the craft navigating the terrain since this requires maneuvers exceeding its capabilities.

The subject of the invention is a method for estimating curvilinear distance within a region where a craft with limited maneuverability is traveling and which contains potential obstacles to be circumvented, which region is referred to as travel region, in which a map of distances is established covering the travel region and having an origin of the distance measurements close to the instantaneous position of the craft, characterized in that it consists, when the distance map is established, in completing the potential obstacles to be circumvented by an additional obstacle to be circumvented which is associated with the craft and placed in its neighborhood, and which encompasses areas of the near neighborhood of the craft considered to be inaccessible to the craft owing to its maneuverability limits.

Advantageously, the additional obstacle is of concave shape and is disposed in the neighborhood of the instantaneous position of the craft in such a manner that its concavity is turned into the direction of the motion of the craft and encompasses the instantaneous position of the craft.

Advantageously, the additional obstacle is U-shaped, the opening of the U being turned into the direction of the motion of the craft and encompassing the instantaneous position of the craft.

Advantageously, the additional obstacle has a half-moon shape, the opening of the half-moon being turned into the direction of the motion of the craft and encompassing the instantaneous position of the craft.

Advantageously, the additional obstacle has a dual-lobed butterfly-wing shape, placed on either side of the instantaneous position of the craft and having a common tangent oriented in the direction of motion of the craft.

Advantageously, when the craft is an aircraft, the contour of the additional obstacle comprises parts corresponding to the ground projections of two circular trajectories associated with the aircraft, allowing a common external tangent at the aircraft, oriented in the direction of the motion of the craft and having a radius equal to the radius of curvature of the tightest turn allowed for the aircraft at the time being considered.

Advantageously, when the craft is an aircraft subject to a cross-wind, the contour of the additional obstacle comprises parts of a cycloid corresponding to the ground projections of two circular trajectories associated with the aircraft, having a radius equal to the radius of curvature of the tightest turn allowed for the aircraft at the time being considered.

Advantageously, when the craft is an aircraft subject to a cross-wind, the contour of the additional obstacle consists of two lobes of a cycloid limited to their parts going from their starting point, which is the instantaneous position of the aircraft, to their second intersection with the straight lines going from the instantaneous position of the aircraft to virtual positions on the cycloid lobes corresponding, for the aircraft, to an arbitrary track modification angle.

Advantageously, when the craft is an aircraft subject to a cross-wind, the contour of the additional obstacle consists of two lobes of a cycloid limited to their parts going from their starting point, which is the instantaneous position of the aircraft, to their second intersection with the straight lines going from the instantaneous position of the aircraft to virtual positions on the cycloid lobes corresponding, for the aircraft, to a track modification angle of 180 degrees.

Advantageously, when the craft is an aircraft subject to a cross-wind and the distance map is established within a geographical reference frame using longitudes and latitudes, the contour of the additional obstacle has two parts in the form of cycloid lobes obeying the system of parametric equations:

$$\begin{pmatrix} x \\ y \end{pmatrix}_g = \begin{pmatrix} WS_{X_g} \cdot t - \delta \cdot R \cdot \cos(wt + \gamma_g) + C_{X_g} \\ WS_{Y_g} \cdot t + R \cdot \sin(wt + \gamma_g) + C_{Y_g} \end{pmatrix}$$

x and y being the abscissae and ordinates of a point in the geographical reference frame of the distance map, $$\begin{pmatrix} WS_X \\ WS_Y \end{pmatrix}$$

being the wind vector expressed in the geographical reference frame of the distance map, with $$R = \frac{TAS^2}{g \cdot \tan \varphi_{roll}}$$

$$w = \frac{TAS}{R} = \frac{g \cdot \tan \varphi_{roll}}{TAS}$$

TAS being the amplitude of the airspeed of the aircraft,
$\varphi_{roll}$ being the roll angle of the aircraft during the maneuver,
γ being a factor that depends on the initial conditions,
δ being a coefficient equal to +1 for a right turn and −1 for a left turn, and with $C_{Xg}$=Long+δ.R. cos(γ$_g$)

$C_{Yg}$=Lat−R. sin(γ$_g$)

γ$_g$=δ.Heading+k.Π

Long being the longitude of the instantaneous position of the aircraft,
Lat being the latitude of the instantaneous position of the aircraft, and
Heading being the flight direction of the aircraft.

Advantageously, the additional obstacle taking into account the maneuverability limits of the craft is missing the surface area of an angular sector starting from the craft and having its opening turned into the direction of motion of the craft.

Advantageously, when the distance map takes the form of a grid of cells corresponding to the elements of a database of elevation of the terrain covering the area of travel of the craft, the additional obstacle taking into account the maneuverability limits of the craft is missing the cells that are totally or partially covered by an angular sector starting from the craft and having its opening turned into the direction of the craft.

Advantageously, when the distance map results from the application, to the pixels of an image formed by a map taken from a database of elevation of the terrain, of a distance transform that uses a chamfer mask cataloging the distances of a pixel under analysis with respect to the nearest pixels, called pixels of the neighborhood, and that has axes of propagation oriented in the directions of the pixels of the neighborhood with respect to the pixel under analysis in the chamfer mask, the additional obstacle taking into account the mobility of the aircraft is missing an angular sector starting from a pixel close to the craft, taken as origin of the distance measurements, and having its opening oriented along the axis of propagation nearest to the direction of the motion of the craft.

Advantageously, when the distance map results from the application, to the pixels of an image formed by a map taken from a database of elevation of the terrain, of a distance transform that uses a chamfer mask cataloging the distances of a pixel under analysis with respect to the nearest pixels, called pixels of the neighborhood, and that has axes of propagation oriented in the directions of the pixels of the neighborhood with respect to the pixel under analysis in the chamfer mask, the additional obstacle taking into account the mobility of the aircraft is missing an angular sector starting from a pixel close to the craft, taken as origin of the distance measurements, corresponding to the angular sector oriented along the axis of propagation nearest to the direction of the motion of the craft and bounded by bisectors of the angles formed by the axes of propagation.

BRIEF DESCRIPTION OF THE DRAWINGS

Other features and advantages of the invention will become apparent from an embodiment presented by way of example. This description will be presented with regard to the drawing in which.

a FIG. 1 shows an example of a distance map covering a region where a craft is traveling and having the position of the craft as origin of the distance measurements, a FIG. 2 shows an example of a chamfer mask that can be used for a distance transform by propagation.

MORE DETAILED DESCRIPTION

Figure 1:
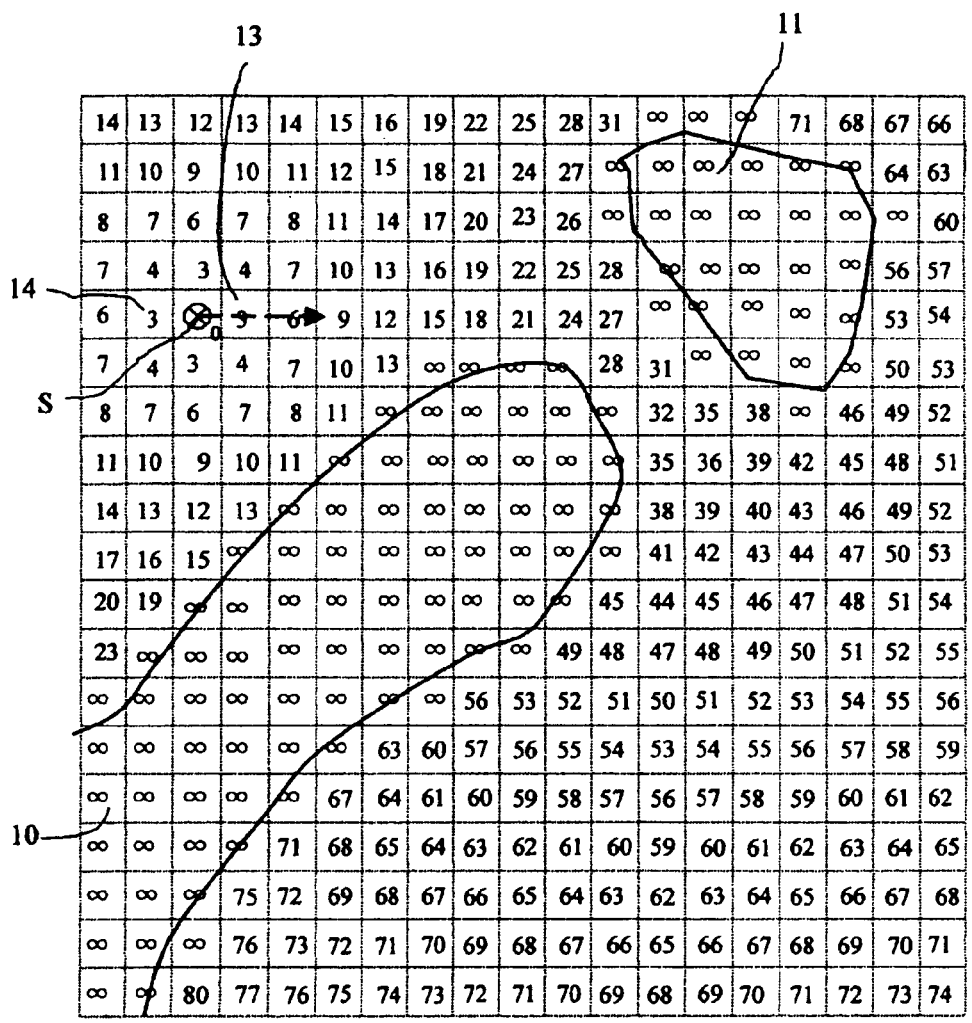

A map of distances over a region of travel is formed from the whole of the values of the distances of the points placed at the nodes of a regular grid in the region of travel with respect to a point of the region taken as origin of the distance measurements. As is shown in FIG. 1, it can be presented in the form of a table of values whose cells correspond to a dissection of the region of travel into cells centered on the nodes of the grid. The regular grid adopted is often that of the points of a database of elevation of the terrain covering the region of travel. The point of the region taken as origin of the distance measurements is the grid node nearest to the ground projection of the instantaneous position of the craft.

Distance maps are often constructed using a distance transform by propagation, also known by the term chamfer distance transform.

Chamfer distance transforms initially appeared in image analysis for estimating distances between objects. Examples of them are described by Gunilla Borgefors in his article entitled "Distance Transformation in Digital Images." published in the journal: Computer Vision, Graphics and Image Processing, Vol. 34 pp. 344-378, February 1986.

The distance between two points of a surface is the minimum length of all the possible paths over the surface starting from one of the points and ending at the other. In an image formed from pixels distributed according to a regular grid of rows, columns and diagonals, a distance transform by propagation estimates the distance of a pixel, called 'target' pixel, from a pixel called 'source' pixel by progressively constructing, starting from the source pixel, the shortest possible route following the pixel grid and ending at the target pixel, and by using as an aid the distances found for the pixels of the image already analyzed and a table, called 'chamfer mask', cataloging the values of the distances between a pixel and its near neighbors.

Figure 2:
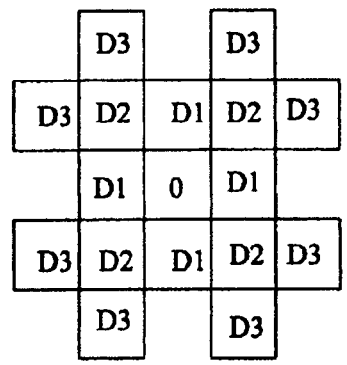

As is shown in FIG. 2, a chamfer mask takes the form of a table with a cell layout reproducing the pattern of a pixel surrounded by its near neighbors. At the center of the pattern, a cell assigned the value 0 locates the pixel taken as origin of the distances cataloged in the table. Around this central cell are grouped the peripheral cells filled with non-zero proximity distance values, which represent the disposition of the pixels in the neighborhood of a pixel assumed to occupy the central cell. The value of proximity distance appearing in a peripheral cell is that of the distance separating a pixel occupying the position of the peripheral cell in question from a pixel occupying the position of the central cell. It is to be noted that the proximity distance values are distributed as concentric circles. A first circle of four cells, corresponding to the four pixels of first rank, which are the nearest to the pixel of the central cell, either in the same row or in the same column, are assigned a proximity distance value D1. A second circle of four cells, corresponding to the four pixels of second rank, which are the nearest pixels to the pixel of the central cell placed on the diagonals, are assigned a proximity distance value D2. A third circle of eight cells, corresponding to the eight pixels of third rank, which are the nearest to the pixel of the central cell while, at the same time, remaining outside of the row, of the column and of the diagonals occupied by the pixel of the central cell, are assigned a proximity distance value D3.

The chamfer mask can cover a more or less extended neighborhood of the pixel of the central cell by cataloging the values of the proximity distances of a greater or smaller number of concentric circles of pixels from the neighborhood. It may be reduced to the first two circles formed by the pixels from the neighborhood of a pixel occupying the central cell, as in the example of the distance maps in FIG. 1, or be extended beyond the first three circles formed by the pixels from the neighborhood of the pixel of the central cell. It is usual to stop at the first three circles as for the chamfer mask shown in FIG. 2. It is only for simplification that the distance map in FIG. 1 is taken no further than the first two circles.

The values of the proximity distances D1, D2, D3, which correspond to Euclidian distances, are expressed in a scale whose multiplying factor permits the use of integer numbers at the cost of a certain approximation. This is the reason that G. Borgefors adopts a scale corresponding to a multiplying factor of 3 or 5. In the case of a chamfer mask retaining the first two circles of proximity distance values, hence of dimensions 3×3, G. Borgefors assigns to the first proximity distance D1, which corresponds to a scale unit on the abscissa or on the ordinate and also to the scale multiplying factor, the value 3 and to the second proximity distance, which corresponds to the square root of the sum of the squares of the abscissa and ordinate scale units $\sqrt{x^2+y^2}$, the value 5. In the case of a chamfer mask retaining the first three circles, hence of dimensions 5×5, it gives to the distance D1, which corresponds to the scale multiplying factor, the value 5, to the distance D2 the value 7, which is an approximation of $5\sqrt{2}$, and to the distance D3 the value 11 which is an approximation of $5\sqrt{5}$.

The progressive construction of the shortest possible route going to a target pixel starting from a source pixel, and following the pixel grid, is carried out by a regular scan of the image pixels by means of the chamfer mask.

Initially, the pixels of the image are assigned a distance value of infinity, actually a number that is sufficiently high so as to exceed all the values of the distances that are measurable in the image, with the exception of the source pixel which is assigned a distance value of zero. Then, the initial distance values assigned to the target points are updated during the scan of the image by the chamfer mask, which update consists in replacing a distance value attributed to a target point by a new lower value resulting from an estimation of distance made during a new application of the chamfer mask to the target point in question.

An estimation of distance by application of the chamfer mask to a target pixel consists in cataloging all the routes going from this target pixel to the source pixel and passing through a pixel in the neighborhood of the target pixel whose distance has already been estimated during the same scan, in searching from amongst the routes cataloged the shortest route or routes and in adopting the length of the shortest route or routes as distance estimate. This is done by placing the target pixel whose distance is to be estimated in the central cell of the chamfer mask, by selecting the peripheral cells of the chamfer mask corresponding to pixels of the neighborhood whose distance has just been updated, by calculating the lengths of the shortest routes linking the target pixel to be updated to the source pixel passing through one of the pixels selected from the neighborhood, by adding the distance value assigned to the pixel of the neighborhood in question to the proximity distance value given by the chamfer mask, and in adopting, as distance estimate, the minimum of the route length values obtained and the old distance value assigned to the pixel being analyzed.

For a pixel under analysis by the chamfer mask, the progressive search for the shortest possible routes starting from a source pixel and going to the various target pixels of the image give rise to a propagation phenomenon in the directions of the pixels that are the nearest neighbors of the pixel under analysis and whose distances are cataloged in the chamfer mask. In the case of a regular distribution of the image pixels, the directions of the nearest neighbors of a pixel that do not vary are considered as propagation axes of the chamfer mask distance transform which is itself often referred to as distance transform by propagation.

The order of the image pixel scan has a bearing on the reliability of the distance estimates and of their updates because the routes taken into account depend on this. In fact, it is subject to a regularity constraint which means that, if the pixels of the image are marked out in the lexicographic order (pixels arranged in an increasing order row by row starting from the top of the image and progressing toward the bottom of the image, and from left to right within a row) and if a pixel p has been analyzed before a pixel q, then a pixel p+x must be analyzed before the pixel q+x. The orders that are lexicographic, reverse lexicographic (scan of the image pixels row by row from bottom to top and, within a row, from right to left), transposed lexicographic (scan of the image pixels column by column from left to right and, within a column, from top to bottom) and reverse transposed lexicographic (scan of the image pixels by column from right to left and, within a column, from bottom to top) satisfy this regularity condition and, more generally, all the scan modes in which the rows and columns are scanned from right to left or from left to right. G. Borgefors recommends a double scan of the image pixels, once in the lexicographic order and then in the reverse lexicographic order.

Figure 3A:
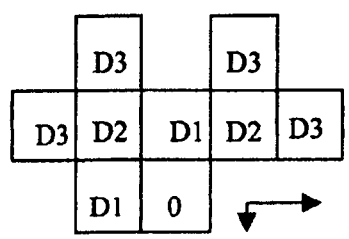
FIGS. 3a and 3b show the cells of the chamfer mask illustrated in FIG. 2, which are used in one scan pass in the lexicographical order and in one scan pass in the reverse lexicographical order, a FIG. 4 shows a part of a distance map centered on the instantaneous position of the craft showing the position and one possible shape of an additional obstacle placed according to the invention so that the distance estimations made in the distance map take the maneuverability limitations of the craft into account, a FIG. 5 illustrates the relationships existing between the track and the heading followed by an aircraft, a FIG. 6 illustrates, within an air reference frame associated with an aircraft, the areas of circular shape that are inaccessible for the aircraft by reason of its maneuverability limits, a FIG. 7 shows the ground trace of the areas of inaccessibility shown in FIG. 1, a FIG. 8 shows a part of a distance map centered on the instantaneous position of the craft showing the position and another possible shape of an additional obstacle placed according to the invention so that the distance estimations made in the distance map take into account the maneuverability limitations of the craft, a FIG. 9 illustrates a way of cataloging the cells of the distance map belonging to the additional obstacle placed according to the invention, a FIG. 10 illustrates the directions and angular sectors defined by a chamfer mask such as that in FIG. 2, FIGS. 11 and 12 illustrate the problems posed by the anisotropy affecting a map taken from a database of elevation of the terrain using a regular grid in latitude and longitude, a FIG. 13 shows the effect of a correction of the anisotropy by stretching on a map taken from a database of elevation of the terrain with regular latitude and longitude grid after correction of the anisotropy.

FIG. 3a shows, in the case of a scan pass in the lexicographic order going from the upper left corner to lower right corner of the image, the cells of the chamfer mask in FIG. 1 used for cataloging the routes going from a target pixel placed on the central cell (cell indexed by 0) to the source pixel passing through a pixel of the neighborhood whose distance has already been estimated in the course of the same scan. There are eight of these cells disposed in the upper left part of the chamfer mask. There are therefore eight routes cataloged in the search for the shortest whose length is taken for estimation of the distance.

Figure 3B:
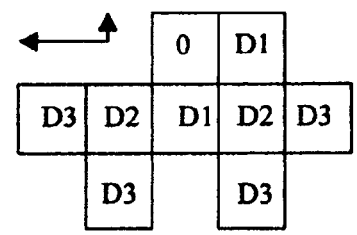

FIG. 3b shows, in the case of a scan pass in the reverse lexicographic order going from the lower right corner to the upper left corner of the image, the cells of the chamfer mask in FIG. 1 used for cataloging the routes going from a target pixel placed on the central cell (cell indexed by 0) to the source pixel passing through a pixel of the neighborhood whose distance has already been estimated in the course of the same scan. These cells are complementary to those in FIG. 2a. There are also eight of them but disposed in the lower right part of the chamfer mask. There are again therefore eight routes cataloged in the search for the shortest whose length is taken for estimation of the distance.

The map of distances shown in FIG. 1 is a simplified example facilitating the understanding of the problem tackled by the invention. This distance map covers a region with two impassable obstacles 10 and 11, where a craft is traveling that is assumed to be at the point S and to be moving in the direction of the arrow. It has been established by means of the simplest of the distance transforms proposed by Gunilla Borgefors, using a chamfer mask of dimension 3'3 with two neighborhood distances 3, 4.

The distance estimations are made independently of the motion of the craft and do not take into account the inability of the craft to follow certain paths for reasons of maneuverability. When a craft has to follow an adaptation track in order to get into a situation where it can rejoin a point on the distance map, this adaptation track falsifies the distance estimate since it may make the effective route followed by the craft significantly longer than the route of minimum length used in the distance estimation. This is especially the case for the points situated in the near neighborhood of the craft but in directions well away from that of its current motion. For example, in the example of distance map illustrated in FIG. 1, the cells 13 and 14, which are the nearest neighbors of the cell occupied by the instantaneous position of the craft (point S), have the same distance estimate 3 although one is in the direction of the motion of the craft (arrow) whereas the other is in the opposite direction. If the craft is considered to be an aircraft, it gets to the cell 13 without difficulty, since it has no maneuver to perform in order to reach it. Conversely, it is difficult for it to reach the cell 14 because it has to perform a complete U-turn before being able to envision getting there. The need to perform this complete U-turn for reasons of maneuverability makes the distance estimate for the cell 14 unrealistic.

More generally, the distance estimations made by taking into account routes of minimum length that are inaccessible to the craft by reason of its limited maneuverability are rendered more or less unrealistic depending on the relative length of the adaptation route which has been neglected.

Figure 4:
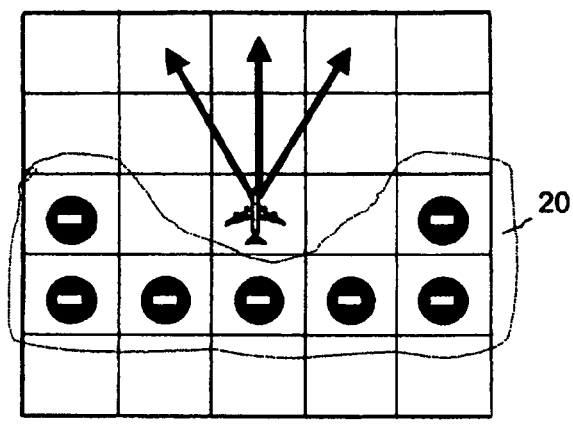

In order to avoid this drawback, as shown in FIG. 4, the invention provides for the addition of a new impassable obstacle 20 to the impassable obstacles (10, 11 FIG. 1) cataloging the cells of the distance map that are inaccessible to the craft owing to its maneuverability limits. This new impassable obstacle 20, is associated with the craft and disposed in its near neighborhood. Its shape is concave, the cell (point S) containing the instantaneous position of the craft being placed within its concavity turned into the direction of the motion of the craft. Its general shape is in the form of a half-moon or U. This new impassable obstacle 20, which moves with the craft, completes the obstacles to be circumvented (10, 11 FIG. 1) and forces the distance transform to put aside, in its search for the lengths of the shortest paths, the paths that are out of range of the craft owing to its limited maneuverability. For an aircraft, this involves prohibiting unrealistic U-turns, turns that are too sharp and even taking the local wind conditions into account.

In order to make a distance map even more realistic in the case of an aircraft, it is advantageous to describe in more detail the shape of this new impassable obstacle 20 associated with the aircraft and with the direction of its motion with respect to the map, hence with respect to the ground, by cataloging the cells of the distance map that are placed in the neighborhood of the aircraft while, at the same time, being inaccessible to it by a direct route owing to its limited maneuverability.

Figure 5:
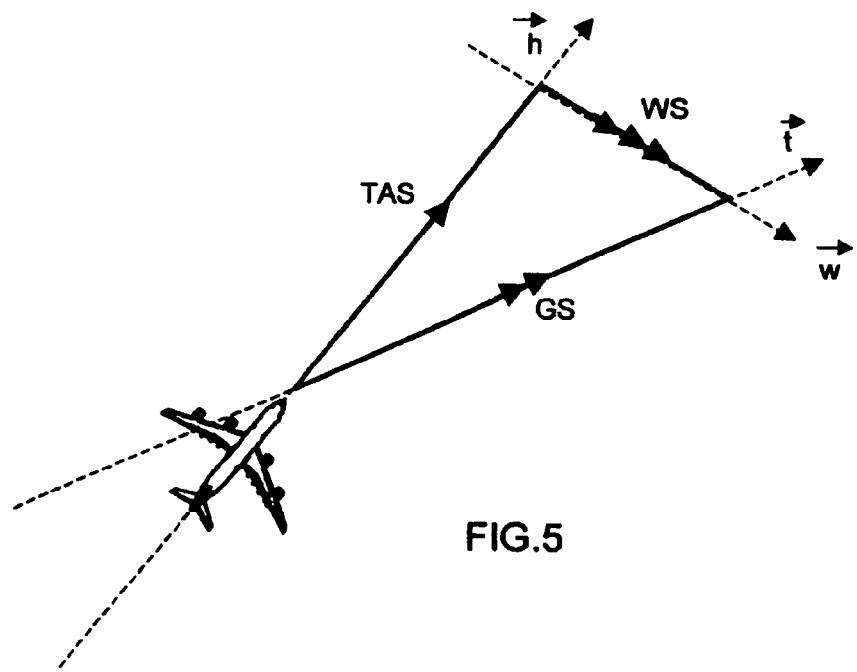

In order to pinpoint the cells of the distance map close to the aircraft but inaccessible to it by a direct route owing to its maneuverability limits, the local wind must be taken into account. Indeed, as is shown in FIG. 5, the direction on the ground of the motion of an aircraft, which is that of its ground speed GS oriented along its track with unity vector $\vec{t}$, corresponds to the direction of the vector sum of the airspeed vector TAS of the aircraft, oriented in the direction of its heading with unity vector $\vec{h}$, and of the wind speed WS oriented along a unity vector $\vec{w}$.

Figure 6:
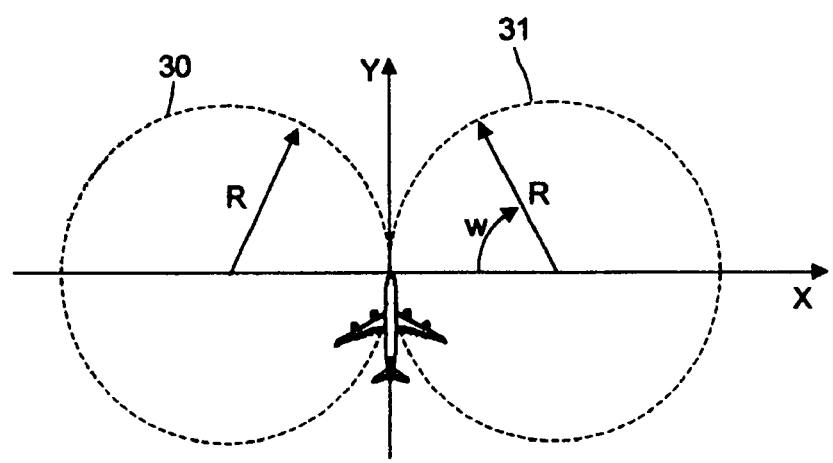

Without wind, as shown in FIG. 6, the cells of the distance map placed in the neighborhood of the aircraft while, at the same time, being inaccessible directly to it are those contained inside two circles 30, 31 passing through the position of the aircraft, having a common tangent oriented along the heading of the aircraft (vector $\vec{Y}$) and a radius R corresponding to the smallest turning radius acceptable at that time. These circles 30, 31, which represent the tightest trajectories allowed in a turn, on one side or the other, for the aircraft, obey the system of parametric equations:

$$\binom{x}{y}(t) = \binom{\delta \cdot R \cdot [1 - \cos(wt + \gamma)]}{R \cdot \sin(wt + \gamma)}$$

with

-continued $$R = \frac{TAS^2}{g \cdot \tan \varphi_{roll}}$$

$$w = \frac{TAS}{R} = \frac{g \cdot \tan \varphi_{roll}}{TAS}$$

$\phi_{roll}$ being the roll angle of the aircraft during the maneuver,
$\gamma$ being a factor depending on the initial conditions,
$\delta$ being a coefficient equal to +1 for a right turn and −1 for a left turn.

The airspeed of the aircraft, when it follows these circles, can then be written:

$$\begin{pmatrix} \dot{x} \\ \dot{y} \end{pmatrix}(t) = \begin{pmatrix} \delta \cdot Rw \cdot \sin(wt+\gamma) \\ Rw \cdot \cos(wt+\gamma) \end{pmatrix} \quad (1)$$

Assuming the wind to be constant in speed and in direction, the circles 30, 31 leave a trace on the ground in the form of a cycloid. The system of parametric equations of this trace can be obtained by integration of the system of parametric equations of the track airspeed on the circles.

When the wind is taken into account, the system (1) of parametric equations of the aircraft speed, expressed in a ground reference frame XY whose ordinate axis Y is directed along the heading of the aircraft, becomes:

$$\begin{pmatrix} \dot{x} \\ \dot{y} \end{pmatrix}(t) = \begin{pmatrix} \delta \cdot Rw \cdot \sin(wt+\gamma) + WS_X \\ Rw \cdot \cos(wt+\gamma) + WS_Y \end{pmatrix} \quad (2)$$

$\begin{pmatrix} WS_X \\ WS_Y \end{pmatrix}$ being the wind vector

By integration, in this ground reference frame, the system of parametric equations of the trace is obtained:

$$\begin{pmatrix} x \\ y \end{pmatrix}(t) = \begin{pmatrix} WS_X \cdot t - \delta \cdot R\cos(wt+\gamma) + C_X \\ WS_Y \cdot t + R \cdot \sin(wt+\gamma) + C_Y \end{pmatrix}$$

$C_x$ and $C_y$ being constants of integration which depend on the reference frame considered.

In an air reference frame $X_h, Y_h$, whose ordinate axis $Y_h$ is oriented along the heading of the aircraft, the system of parametric equations (1) becomes:

$$\begin{pmatrix} \dot{x} \\ \dot{y} \end{pmatrix}_{t=0} = \begin{pmatrix} \delta \cdot Rw \cdot \sin(wt+\gamma) + WS_{X_h} \\ Rw \cdot \cos(wt+\gamma) + WS_{Y_h} \end{pmatrix} \quad (3)$$

By integration, in this air reference frame, it gives the system of parametric equations of the trace:

$$\begin{pmatrix} x \\ y \end{pmatrix}_h(t) = \begin{pmatrix} WS_{X_h} \cdot t - \delta \cdot R \cdot \cos(wt+\gamma_h) + C_{X_h} \\ WS_{Y_h} \cdot t + R \cdot \sin(wt+\gamma_h) + C_{Y_h} \end{pmatrix} \quad (4)$$

The position initial condition is:

$$\begin{pmatrix} x \\ y \end{pmatrix}_{t=0} = \begin{pmatrix} 0 \\ 0 \end{pmatrix} \quad (5)$$

because the aircraft is initially in the center of the reference frame. The initial velocity condition is:

$$\begin{pmatrix} \dot{x} \\ \dot{y} \end{pmatrix}_{t=0} = \begin{pmatrix} WS_{X_h} \\ TAS + WS_{Y_h} \end{pmatrix} \quad (6)$$

because the aircraft has a velocity vector initially oriented along the track axis $\vec{t}$.

At the initial time $t=0$, for the initial airspeed, the system of equations (3) gives:

$$\begin{pmatrix} \dot{x} \\ \dot{y} \end{pmatrix}_{t=0} = \begin{pmatrix} \delta \cdot Rw \cdot \sin(\gamma) + WS_{X_h} \\ Rw \cdot \cos(\gamma) + WS_{Y_h} \end{pmatrix}$$

The initial velocity condition (equation 6) implies:

$$\begin{cases} \cos(\gamma_h) = 1 \\ \sin(\gamma_h) = 0 \end{cases} \Rightarrow \gamma_h = 0 \quad (7)$$

Taking these equations (7) into account in the system of equations (4) leads to:

$$\begin{pmatrix} x \\ y \end{pmatrix}_h(0) = \begin{pmatrix} -\delta \cdot R \cdot + C_{X_h} \\ C_{Y_h} \end{pmatrix}$$

and the initial position condition (equation 5) implies:

$C_{X_h} = \delta.R$.

$C_{y_h} = 0$

In a ground reference frame $X_t, Y_t$, whose ordinate axis $Y_t$ is oriented along the track of the aircraft, the system of parametric equations (1) becomes:

$$\begin{pmatrix} \dot{x} \\ \dot{y} \end{pmatrix}_t(t) = \begin{pmatrix} \delta \cdot Rw \cdot \sin(wt+\gamma_t) + WS_{X_t} \\ Rw \cdot \cos(wt+\gamma_t) + WS_{Y_t} \end{pmatrix}$$

By integration, in this ground reference frame, it gives the system of parametric equations of the trace:

$$\begin{pmatrix} x \\ y \end{pmatrix}_t = \begin{pmatrix} WS_{X_t} \cdot t - \delta \cdot R \cdot \cos(wt+\gamma_t) + C_{X_t} \\ WS_{Y_t} \cdot t + R \cdot \sin(wt+\gamma_t) + C_{Y_t} \end{pmatrix}$$

The initial position condition:

$$\binom{x}{y}_t (0) = \binom{0}{0}$$

expressing that the aircraft is initially at the center of the reference frame, and that of initial velocity:

$$\binom{\dot{x}}{\dot{y}}_t (0) = \binom{0}{GS}$$

expressing that the aircraft has a velocity vector initially oriented along the track axis $\vec{t}$, lead to the values of integration constants:

$C_{Xt} = \delta.R. \cos(\gamma_t)$ $C_{Yt} = -R. \sin(\gamma_t)$ $\gamma_t = -\delta.(\text{Track} - \text{Heading})$ In the geographical reference frame $X_g Y_g$, used by the distance map, the system of parametric equations (1) becomes:

$$\binom{\dot{x}}{\dot{y}}_g (t) = \binom{\delta \cdot Rw \cdot \sin(wt + \gamma_g) + WS_{X_g}}{Rw \cdot \cos(wt + \gamma_g) + WS_{Y_g}}$$

By integration, in this geographical reference frame, it gives the system of parametric equations of the trace:

$$\binom{x}{y}_g = \binom{WS_{X_g} \cdot t - \delta \cdot R \cdot \cos(wt + \gamma_g) + C_{X_g}}{WS_{Y_g} \cdot t + R \cdot \sin(wt + \gamma_g) + C_{Y_g}}$$

The initial position condition:

$$\binom{x}{y}_g (0) = \binom{X_0}{Y_0}$$

and the initial velocity condition:

$$\binom{\dot{x}}{\dot{y}}_g (0) = \binom{GS \cdot \sin(\text{track})}{GS \cdot \cos(\text{track})}$$

lead to the values of integration constants:

$C_{Xt} = \delta.R. \cos(\gamma_g)$ $C_{Yt} = -R. \sin(\gamma_g)$ $\tan g(\gamma_g) = -\delta. \tan(\text{Heading})$ or else:

$C_{Xg} = \text{Long} + \delta.R. \cos(\gamma_g)$ $C_{Yg} = \text{Lat} - R. \sin(\gamma_g)$ $\gamma_g = \delta.\text{Heading} + k. \Pi$ In fact, the aircraft only follows the ground traces of the two circles (30, 31 FIG. 5) for the time needed for a maneuver to change track and heading.

The transition time for changing heading depends on the angular velocity of the airplane and hence on its roll angle.

$$T_{transition} = \frac{H_2 - H_1}{w}$$

with:

$$w = \frac{TAS}{R} = \frac{g \cdot \tan\varphi_{roll}}{TAS}$$

The change of track additionally depends on the wind conditions. The final heading may be written $$\text{Heading}_{final} = \begin{cases} \text{Track}_{final} - a\sin\left(\frac{WS_{X\,final}}{TAS}\right) + 2 \cdot (k+1) \cdot \Pi \\ \text{Track}_{final} + a\sin\left(\frac{WS_{X\,final}}{TAS}\right) + 2 \cdot k \cdot \Pi \end{cases}$$

and the duration of the transition time for changing track:

$$T_{transition} = \frac{|\text{Heading}_{final} - \text{Heading}_{initial}|}{w}.$$

Figure 7:
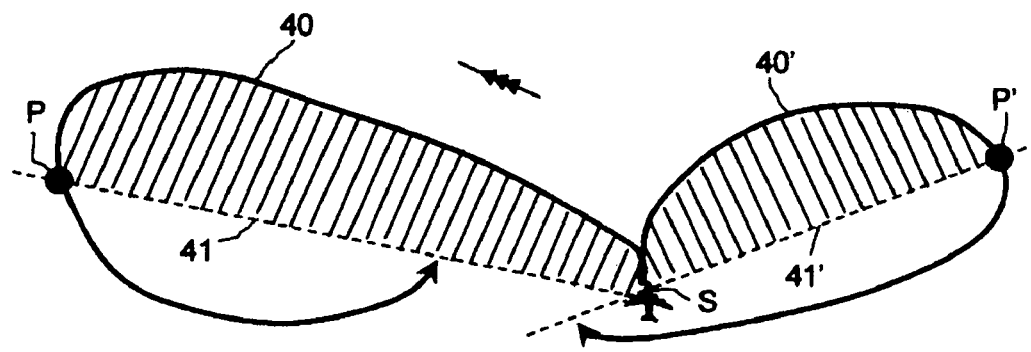

Finally, in order to determine the cells of the distance map belonging to the impassable obstacle (20 FIG. 4) since considered inaccessible to the aircraft owing to its limited maneuverability, as shown in FIG. 7, a closed contour formed from the two parts 40, 40' of the ground traces of the two circles (30, 31 FIG. 5) is traced starting from the initial position of the aircraft (point S) up to points P, P' corresponding to a given change of track, for example 180°, and from the two straight lines 41, 41' joining the ends P, P' of the two trace parts 40, 40' to the initial position of the aircraft (point S). This gives a shape with two lobes in the form a butterfly wing to the impassable obstacle associated with the aircraft. Once the contour has been determined, the cells contained within the contour are selected for the obstacle, neglecting those situated in front of the initial position of the aircraft, in the direction of its motion.

Figure 8:
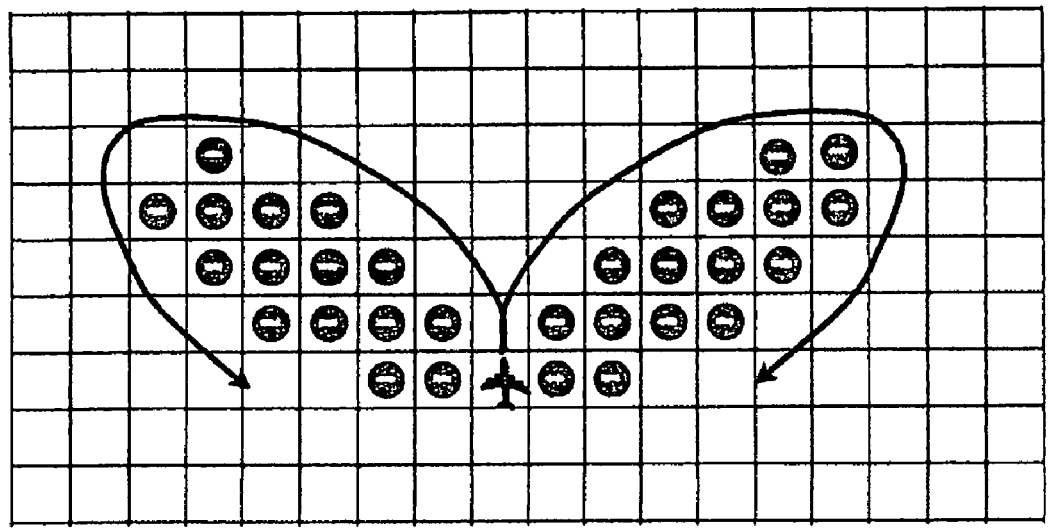

One way of selecting, for the obstacle, the cells contained within a contour that has been previously determined, avoiding the cells situated in front of the initial position of the aircraft, in the direction of its motion, consists, as shown in FIG. 8, in only taking those that are entirely situated within the contour and in not considering those that are only partially contained within it.

Figure 9:
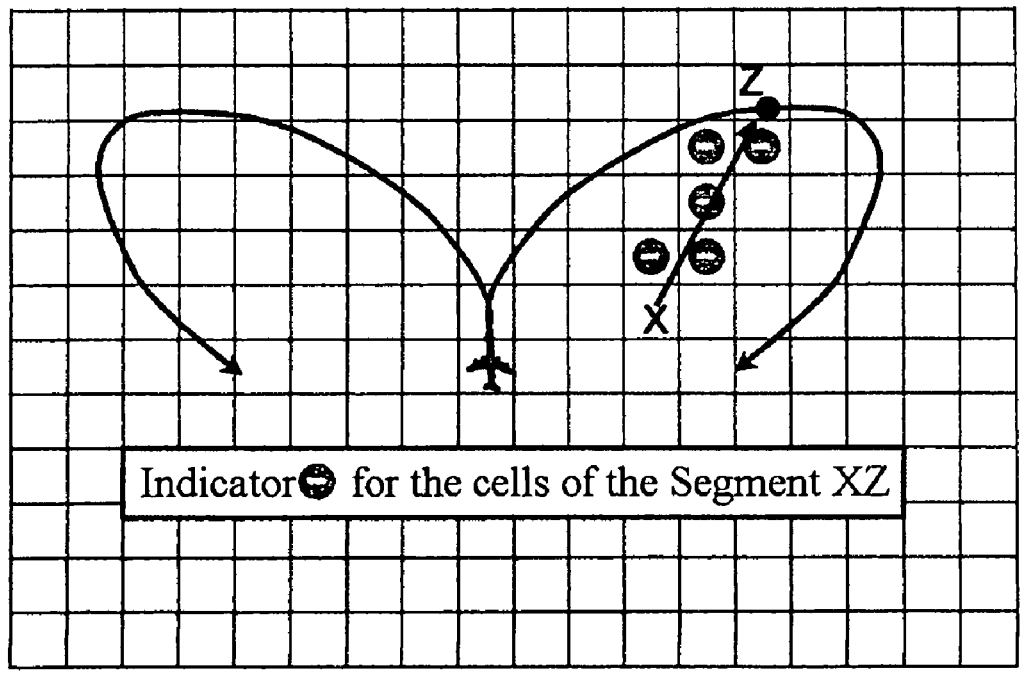

In order to catalog the cells contained within a closed contour, as shown in FIG. 9, a cell X can be chosen that is known to be inside the contour, can describe the contour by a moving point Z and can assimilate the cells crossed by the straight line segment XZ into the cells contained within the contour.

In order to improve the propagation of a distance transform using a chamfer mask and to obtain more quickly, by scanning, stable distance estimates over all of the cells of the map of the region shown, it is advantageous, in order to take the aircraft maneuverability into account, to exclude from the addition obstacle associated with it the cells of the map belonging, either completely or partially, to an angular sector starting from the current aircraft position and having its opening turned into the direction of the track followed by the aircraft. Indeed, removing these cells from any obstacle allows one or more propagation axes of the chamfer distance transform at the current position of the aircraft, and hence at the pixel taken as origin of the distance measurements, having orientations close to that of the aircraft motion, to be left free; this increases the plot possibilities, in the neighborhood of the current position of the aircraft, hence of the source pixel, for the paths going from the target pixels to the source pixel and reinforces the chances of finding quickly a route of minimum length in the course of the scan performed by the chamfer mask.

The angular sector bounding the cells left free of propagation is chosen as being that of the angular sectors, bounded by the bisectors of the angles formed by the propagation axes plotted at the pixel closest to the current position of the aircraft, taken as source pixel and origin for the distance measurements, having its orientation closest to that of the aircraft motion.

Figure 10:
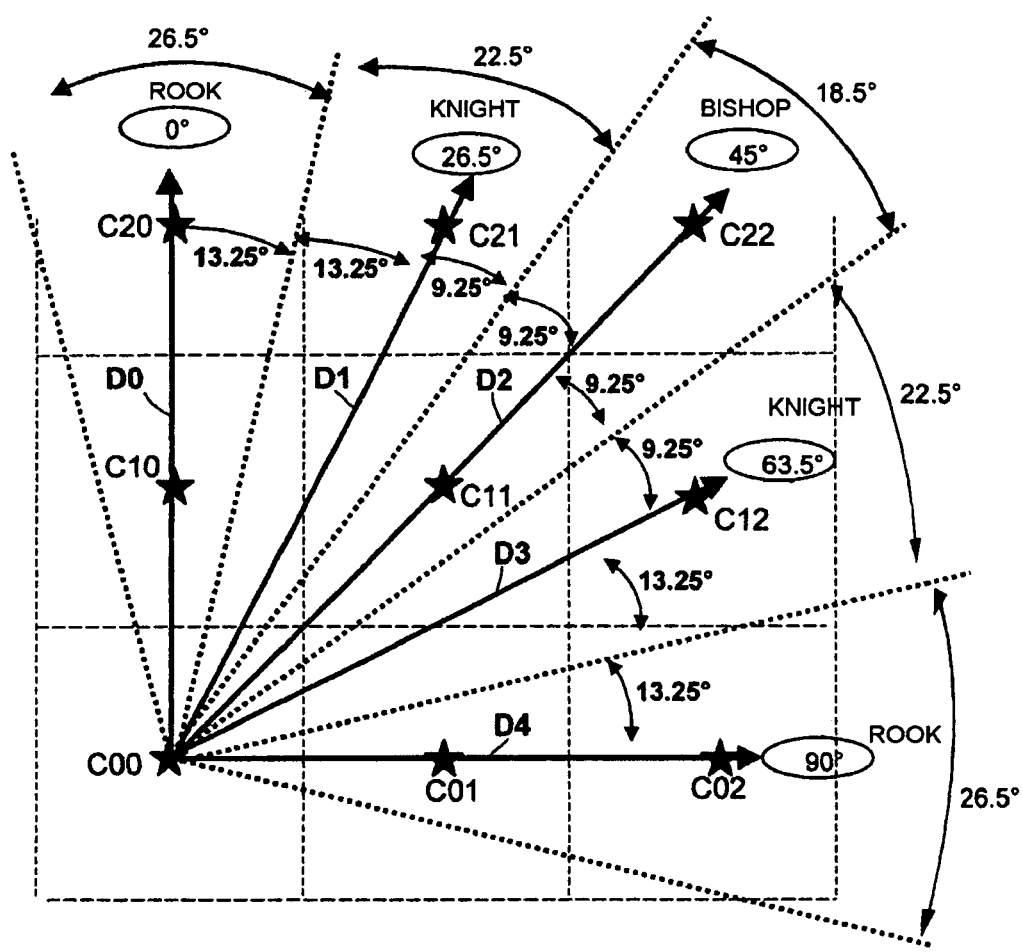

FIG. 10 shows a part of the ray group of the propagation axes defined by the image pixels concerned by the upper right-hand quarter of the chamfer mask in FIG. 2 applied to the pixel C00 taken as origin of the distance measurements since it is assumed to be the closest to the current position of the aircraft. These can be separated into the pixels of first rank C01 and C10 being the immediate neighbors of the pixel under analysis C00 on the same row or in the same column, the pixel of second rank C11 immediate neighbor of the pixel under analysis C00 on the first diagonal, the pixels of third rank C12 and C21 immediate neighbors of the pixel under analysis C00 but not on the same row, nor in the same column, nor on the same diagonal as the latter. The various orientations of these pixels of first, second and third rank C01, C10, C11, C12, C21, immediate neighbors of the pixel under analysis C00, define the only possible directions of propagation for the distance transform in the upper right-hand quarter of the chamfer mask, actually the northeast quarter for a map image whose top faces north and whose right-hand side faces east. These five propagation directions, shown in FIG. 10 by solid bold and arrowed lines, may be completed by horizontal and vertical symmetry.

The direction D0 of the propagation of the pixel C00 under analysis toward the pixel C10 of first rank in the same column is used as angular reference and corresponds, using the terminology of chess, to a rook move. The direction D1 of the propagation of the pixel C00 under analysis toward the pixel of third rank C21, disposed on a different row, column and diagonal, is angularly closest to the direction D0. With a regular grid of pixels, in other words in the absence of anisotropy of the map image, it makes an angle of 26.5 degrees with respect to the latter and corresponds, using the terminology of chess, to a knight move. The direction D2 of the propagation of the pixel C00 under analysis toward the pixel C11 of second rank on the same diagonal is a little further away. In the absence of anisotropy of the map image, it makes an angle of 45 degrees with respect to the reference direction D0. It corresponds, using the terminology of chess, to a bishop move. The direction D3 of the propagation of the pixel C00 under analysis toward the pixel of third rank C12 disposed on a different row, column and diagonal is even further away. In the absence of anisotropy of the image, it makes an angle of 63.5 degrees with respect to the reference direction D0. It corresponds, using the terminology of chess, to a knight move. Finally, the direction D4 of the propagation of the pixel C00 under analysis toward the pixel of first rank C01 on the same row is the furthest away and makes an angle of 90 degrees with respect to the reference direction D0. It corresponds, using the terminology of chess, to a rook move.

The bisectors of the angles formed by these five propagation directions D0, D1, D2, D3 and D4 define five circular sectors in the upper right-hand quarter of the chamfer mask centered on the pixel C00 under analysis and directed in the five propagation directions, namely:

an angular sector referred to as 'C10 rook' because it is oriented toward the pixel C10, in the direction D0 corresponding to the move of a rook, an angular sector referred to as 'C21 knight' because it is oriented toward the pixel C21, in the direction D1 corresponding to the move of a knight, an angular sector referred to as 'C11 bishop' because it is oriented toward the pixel C11, in the direction D2 corresponding to the move of a bishop, an angular sector referred to as 'C12 knight' because it is oriented toward the pixel C12, in the direction D3 corresponding to the move of a knight, and an angular sector referred to as 'C01 rook' because it is oriented toward the pixel C01, in the direction D4 corresponding to the move of a rook.

The following table catalogs these five angular sectors:

| Sector | Lower Limit | Upper Limit |
| --- | --- | --- |
| C10 Rook | −13.25 | 13.25 |
| C21 Knight | 26.5 − 13.25 | 26.5 + 9.25 |
| C11 Bishop | 45 − 9.25 | 45 + 9.25 |
| C12 Knight | 63.5 − 9.25 | 63.5 + 13.25 |
| C01 Rook | 90 − 13.25 | 90 + 13.25 |

Thus, with an aircraft moving in the direction of the upper right-hand quarter of the map, from the five angular sectors that sector is chosen whose orientation corresponds, at best, to that of the track of the aircraft.

Figure 11:
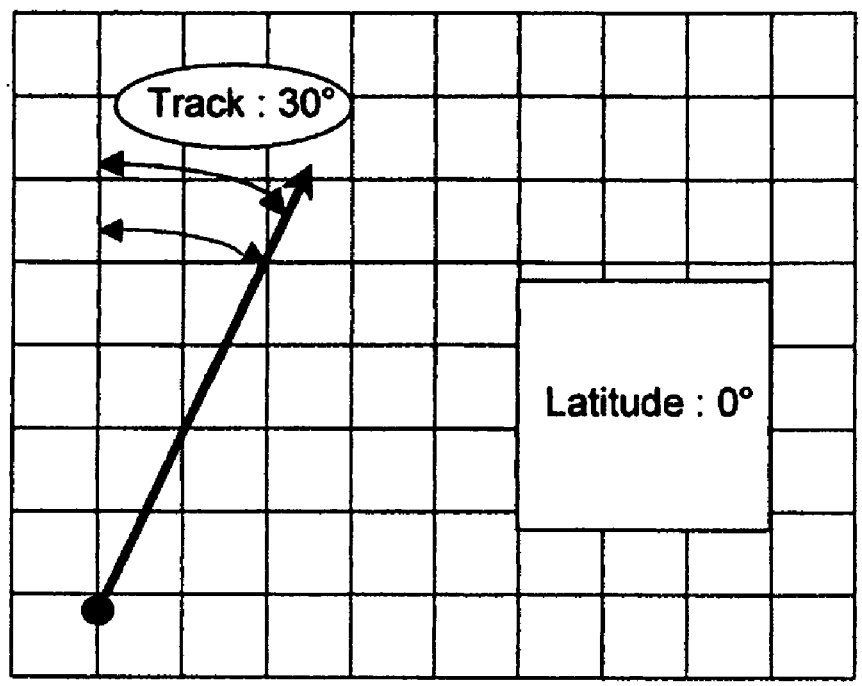
Figure 12:
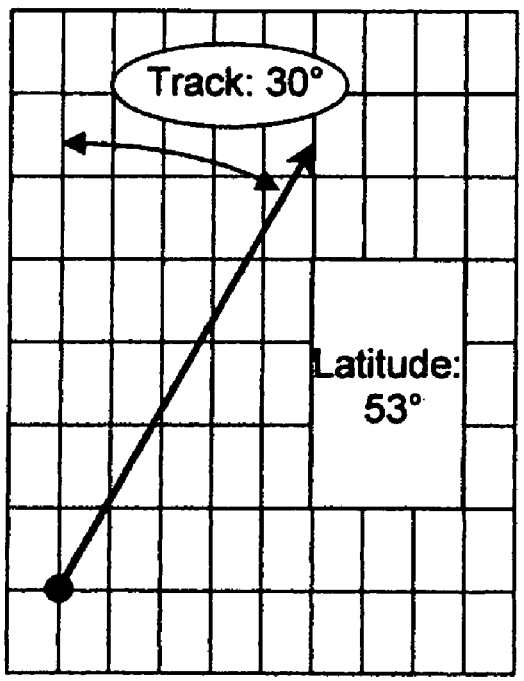

In the case of a map image taken from a database of elevation of the terrain with regular grid in longitude and in latitude of the earth's surface, it is preferable to take into account the anisotropy introduced by the gradual narrowing of the meridians in the direction of the poles. Indeed, as is shown in FIGS. 11 and 12, such a map exhibits a cell grid of variable width, going from a square shape at a latitude of 0° (FIG. 11) to a distinctly rectangular shape at a latitude of 53°(FIG. 12) implying that an aircraft following the same track orientation at the same ground speed does not cross the same cells in the same time.

Figure 13:
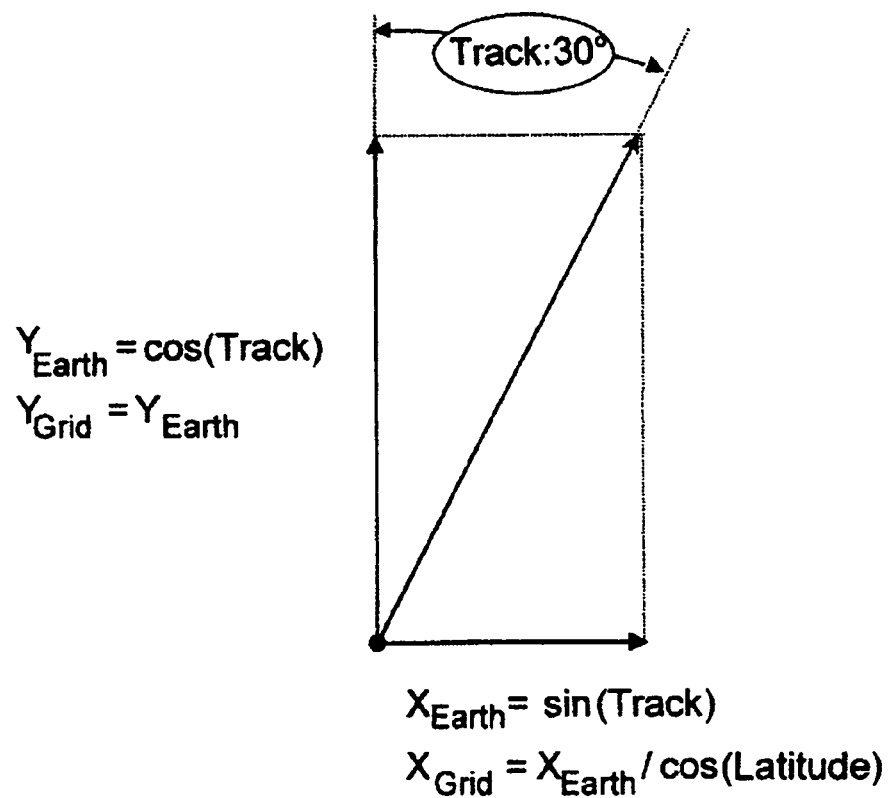
Figure 14:
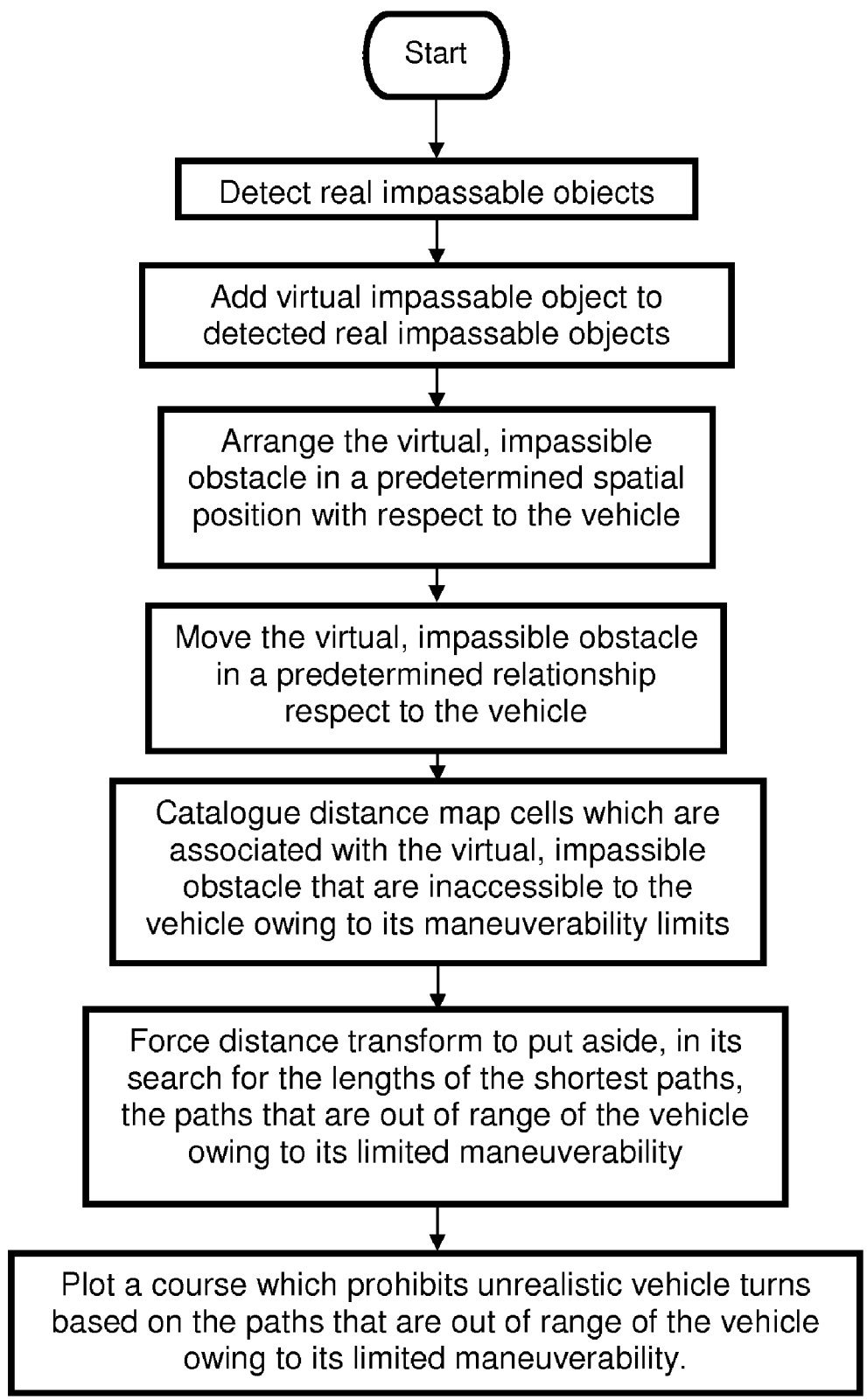
FIG. 14 depicts, in flow chart form, the steps which are implemented in one embodiment of the invention.

In order to take into account this anisotropy, whose extent varies as a function of latitude, an artificial stretching of the map is proposed in order to return its cell grid to a square shape. As shown in FIG. 13, the unity vector of the ordinate axis of the orientation reference frame is not affected by this stretching applied in a direction which is perpendicular to it. The unity vector of the ordinate axis before stretching $Y_{Earth}$ remains equal to the unity vector $Y_{Grid}$ after stretching, whereas the unity vector of the abscissa axis before stretching $X_{Earth}$ ends up, after stretching, dilated by the ratio of 1/cos (Latitude):

$$\begin{cases} Y_{Grid} = Y_{Earth} \\ X_{Grid} = \dfrac{X_{Earth}}{\cos(\text{Latitude})} \end{cases}$$

The result of this is that the new orientation of the aircraft track to be taken into consideration after stretching (TrackOnGrid) is linked to the real orientation of the aircraft track (Track) by the equation:

$$TrackOnGrid = \arctan\left(\dfrac{\tan(\text{Track})}{\cos((\text{Latitude}))}\right)$$

It goes without saying that, when it is applied to aircraft, the method for estimating curvilinear distance that has just been described takes the flight vertical profile into account, the contours of the obstacles to be circumvented being updated as a function of the flight time of the routes tested during the search for the shortest paths whose lengths are taken for estimations of the distances, in order to take into account the altitude reached at each moment in time deduced from the flight vertical profile.

The invention claimed is:

1. A method for estimating, by a terrain navigational system of a moving vehicle with limited maneuverability, curvilinear distances to be traversed by the vehicle from its instantaneous position to reach points of a travel region containing potential obstacles to be circumvented by said vehicle in order to establish a distance map covering the travel region wherein the curvilinear distance estimations of the distance map are obtained by means of a distance transform, the method comprising the steps of:
providing a virtual, impassible obstacle in addition to detected real impassible obstacles;
arranging the virtual, impassible obstacle in a predetermined spatial position with respect to the vehicle;
moving the virtual, impassible obstacle in a predetermined relationship respect to the vehicle;
cataloging distance map cells which are associated with the virtual, impassible obstacle that are inaccessible to the vehicle owing to its maneuverability limits;
forcing the distance transform to put aside, in its search for the lengths of the shortest paths, the paths that are out of range of the vehicle owing to its limited maneuverability; and
plotting a course which prohibits unrealistic vehicle turns based on the paths that are out of range of the vehicle owing to its limited maneuverability.

2. The method as claimed in claim 1, wherein the virtual, impassible obstacle is of concave shape and disposed in the neighborhood of the instantaneous position of the vehicle, the concavity being turned into a direction of a motion of the vehicle and encompasses the instantaneous position of the vehicle.

3. The method as claimed in claim 1, wherein the virtual, impassible obstacle is U-shaped, the opening of the U being turned into the direction of a motion of the vehicle and encompassing an instantaneous position of the vehicle.

4. The method as claimed in claim 1, wherein the virtual, impassible obstacle has a half-moon shape, an opening of the half-moon being turned in a direction of motion of the vehicle and encompassing an instantaneous position of the vehicle.

5. The method as claimed in claim 1, wherein the virtual, impassible obstacle has a dual-lobed butterfly-wing shape, placed on either side of an instantaneous position of the craft and having a common tangent oriented in a direction of motion of the craft.

6. The method as claimed in claim 1, wherein when the vehicle is an aircraft, the contour of the virtual, impassible obstacle comprises parts corresponding to ground projections of two circles passing through the position of the aircraft, having a radius equal to a radius of curvature of a tightest turn allowed for the aircraft at the time being considered.

7. The method as claimed in claim 1, wherein when the vehicle is an aircraft subject to a cross-wind, a contour of the virtual, impassible obstacle comprises parts of a cycloid corresponding to ground projections of two circles associated with the aircraft, having a radius equal to a radius of curvature of a tightest turn allowed for the aircraft at the time being considered.

8. The method as claimed in claim 1, wherein, when the vehicle is an aircraft subject to a cross-wind, a contour of the virtual, impassible obstacle consists of two lobes of a cycloid limited to their parts going from their starting point, which is an instantaneous position of the aircraft, to their second intersection with straight lines going from the instantaneous position of the aircraft to virtual positions on the cycloid lobes corresponding, for the aircraft, to an arbitrary track modification angle.

9. The method as claimed in claim 1, wherein when the vehicle is an aircraft subject to a cross-wind, a contour of the virtual, impassible obstacle consists of two lobes of a cycloid limited to their parts going from their starting point, which is an instantaneous position of the aircraft, to their second intersection with straight lines going from the instantaneous position of the aircraft to virtual positions on the cycloid lobes corresponding, for the aircraft, to a track modification angle of 180 degrees.

10. The method as claimed in claim 1, wherein when the vehicle is an aircraft subject to a cross-wind and the distance map is established within a geographical reference frame using longitudes and latitudes, a contour of the additional obstacle has two parts in the form of cycloid lobes obeying a system of parametric equations:

$$\begin{pmatrix} x \\ y \end{pmatrix}_g = \begin{pmatrix} WS_{X_g} \cdot t - \delta \cdot R \cdot \cos(wt + \gamma_g) + C_{X_g} \\ WS_{Y_g} \cdot t + R \cdot \sin(wt + \gamma_g) + C_{Y_g} \end{pmatrix}$$

x and y being abscissae and ordinates of a point in a geographical reference frame of the distance map, $$\begin{pmatrix} WS_X \\ WS_Y \end{pmatrix}$$

being a wind vector expressed in the geographical reference frame of the distance map,
with $$R = \dfrac{TAS^2}{g \cdot \tan\varphi_{roll}}$$

$$w = \dfrac{TAS}{R} = \dfrac{g \cdot \tan\varphi_{roll}}{TAS}$$

TAS being an amplitude of an airspeed of the aircraft,
($\Phi_{roll}$ being a roll angle of the aircraft during a maneuver, γ being a factor that depends on initial conditions,
δ being a coefficient equal to +1 for a right turn and −1 for a left turn, and
with $$C_{Xg} = \text{Long} + \delta.R.\cos(\gamma_g)$$

$$C_{Yg} = \text{Lat} - R.\sin(\gamma_g)$$

$$\gamma_g = \delta.\text{Heading} + k.\Pi$$

Long being a longitude of the instantaneous position of the aircraft,
Lat being a latitude of the instantaneous position of the aircraft, and
Heading being a flight direction of the aircraft.

11. The method as claimed in claim 1, wherein the virtual, impassible obstacle taking into account maneuverability limits of the craft is missing a surface area of a free angular sector starting from the vehicle and having its opening turned into a direction of motion of the vehicle.

12. The method as claimed in claim 11, wherein, when the distance map takes the form of a grid of cells corresponding to the elements of a database of elevation of the terrain covering the area of travel of the vehicle, the virtual, impassible obstacle taking into account maneuverability limits of the vehicle is missing the cells that are totally or partially covered by a free angular sector.

13. The method as claimed in claim 11, wherein, when the distance map results from an application, to the pixels of an image formed by a map taken from a database of elevation of the terrain, of a distance transform that uses a chamfer mask cataloging the distances of a pixel under analysis with respect to nearest pixels, called pixels of the neighborhood, and that has axes of propagation oriented in directions of the pixels of the neighborhood with respect to the pixel under analysis in the chamfer mask, the free angular sector has its opening oriented along the axis of propagation nearest to the direction of motion of the craft.

14. The method as claimed in claim 12, wherein the free angular sector of propagation is bounded by bisectors of angles formed by axes of propagation.

* * * * *